United States Patent [19]

Okada et al.

[11] 4,336,554
[45] Jun. 22, 1982

[54] CODE SIGNAL BLANKING APPARATUS

[75] Inventors: Masataka Okada; Toshimi Shiun, both of Toda, Japan

[73] Assignee: Clarion Co., Ltd., Tokyo, Japan

[21] Appl. No.: 161,696

[22] Filed: Jun. 23, 1980

[51] Int. Cl.³ .......................... H04N 7/16; H04K 1/04
[52] U.S. Cl. ..................................... 358/124; 358/120; 358/122; 358/123
[58] Field of Search ............... 358/118, 120, 122, 123, 358/124

[56] References Cited
U.S. PATENT DOCUMENTS 3,478,166  11/1969  Reiter et al. ......................... 358/120
3,924,059  12/1975  Horowitz ............................. 358/124
4,022,972  5/1977   Pires .................................... 358/124
4,222,068  9/1980   Thompson ........................... 358/124
4,257,065  3/1981   Papay .................................. 358/124

Primary Examiner—S. C. Buczinski

[57] ABSTRACT

A code signal blanking apparatus comprising a switching means operative during a given period of a vertical blanking period of a television signal and a reference level setting means for producing an output of the reference level during said given period when the switching circuit is operative. A code signal is blanked by keeping a video signal level of the television signal at the reference level during said given period of the vertical blanking period of the television signal.

9 Claims, 6 Drawing Figures

4,336,554

CODE SIGNAL BLANKING APPARATUS

BACKGROUND OF THE INVENTION

This invention relates to a code signal blanking apparatus, and more particularly, but not by way of limitation, an apparatus for blanking a code signal superposed on a television signal during a vertical blanking period in a pay-TV system.

A so-called wireless pay-TV system, to which the present invention is applicable, has been developed to eliminate annoying commercial messages indispensable to ordinary commercial broadcasting and possible degradation of broadcasting quality due to various restrictions inherent to the commercial broadcasting. This wireless system is expected to be spread wide because expenses and time required for laying cables can be curtailed and there is no limitation in number of subscribers.

In general, in the wireless pay-TV system, a television signal and an aural signal are encoded so that the system may be applied only to the subscribers of the system, excluding non-subscribers. More specifically, a transmitting station includes an encoder for encoding a video signal by randomly inverting or not inverting the video signal with reference to a gray level according to a predetermined procedure. The encoder has a key code for encoding. The video signal is encoded based on the key code. At the same time, data for decoding prepared based on the same key code is added to the television signal as a code signal in the form of a binary code. On the other hand, a decoder provided at a receiving unit receives the encoded television signal, reads the code signal for decoding to reduce it to the key code and decodes the encoded television signal into an ordinary television signal using the key code. As to the aural signal, similar operation is carried out.

The code signal as mentioned above is inserted during a vertical blanking period when the beam does not appear on a picture of a television set. However, sometimes, the insertion of the code signal possibly causes disturbance of a vertical signal or appearance of a binary code on the picture.

OBJECT OF THE INVENTION

It is therefore an object of the present invention to provide a novel code signal blanking apparatus for blanking a code signal after deriving a key code from the code signal to eliminate an influence of the code signal.

SUMMARY OF THE INVENTION

In accordance with the present invention, there is provided a code signal blanking apparatus which comprises:

a means for receiving a television signal with a code signal superposed thereon during a vertical blanking period;

a switching means adapted to receive the television signal;

an actuating means for operating said switching means during a given period within the vertical blanking period;

an output terminal for outputting the television signal through said switching means; and a reference level setting means for outputting a preset reference level to said output terminal during the period when said switching means operates to keep a level of a video signal of said television signal at said reference level during said given period of the vertical blanking period.

DESCRIPTION OF THE PREFERRED EMBODIMENT

Figure 1:
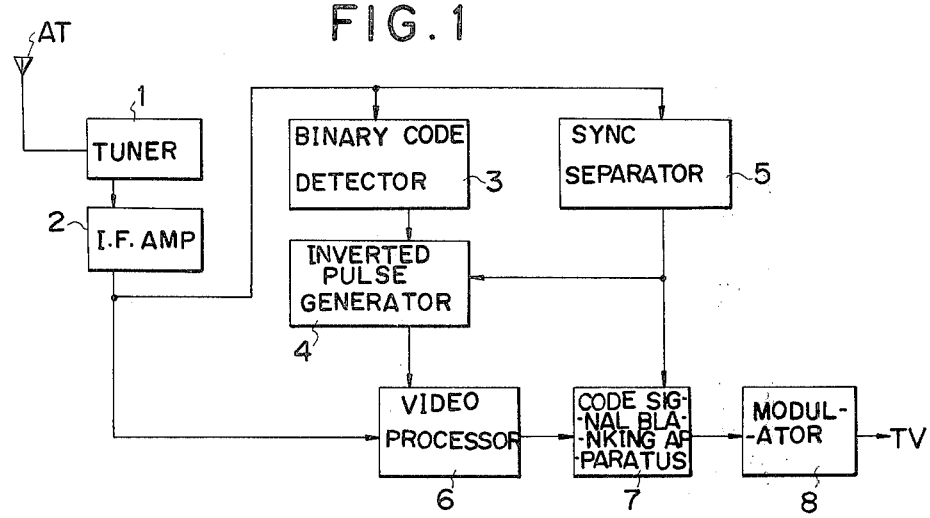
FIG. 1 is a block diagram of a decoder employing a code signal blanking apparatus of the present invention.

The invention will be described in detail referring to an embodiments illustrated in the drawings.

FIG. 1 is a block diagram of a decoder to which the code signal blanking apparatus of the invention is applied. The decoder is comprised essentially of a tuner 1, an IF circuit, a binary code detector 3, an inverted pulse generator 4, a sync separator 5, a video processor 6, a code signal blanking apparatus 7 and a modulator 8. A television signal received through an antenna AT and selected by the tuner 1 is amplified by the IF circuit 2 and supplied to the binary code detector 3, the sync separator 5 and the video processor 6 simultaneously. A code signal is superposed on a television signal during a vertical blanking period (first 6H is used in the illustrated embodiment) and each of horizontal scanning period contains a 4-bits binary code. The binary code detector 3 extracts the code signal (binary code) during the vertical blanking period. The sync separator 5 detects a horizontal synchronizing signal and a vertical synchronizing signal from the television signal and supplies the detected signals to the inverted pulse generator 4 and the code signal blanking apparatus 7. The inverted pulse generator 4 produces inverted pulses (of the horizontal synchronizing signal and the vertical synchronizing signal) for decoding the encoded inverted television signal into a normal television signal using a key code obtained from the code signal detected by the binary code detector 3 and supplies the so decoded television signal to the video processor 6. The video processor 6 decodes the encoded television signal received from the IF circuit 2 into the normal television signal by the signal from the inverted pulse generator 4. The code signal blanking apparatus 7 carries out blanking of the code signal, which is no more needed, in a manner as will be described later. The modulator 8 modulates the decoded normal television signal so that it may be visible and audible with an ordinary TV set.

Figure 3:
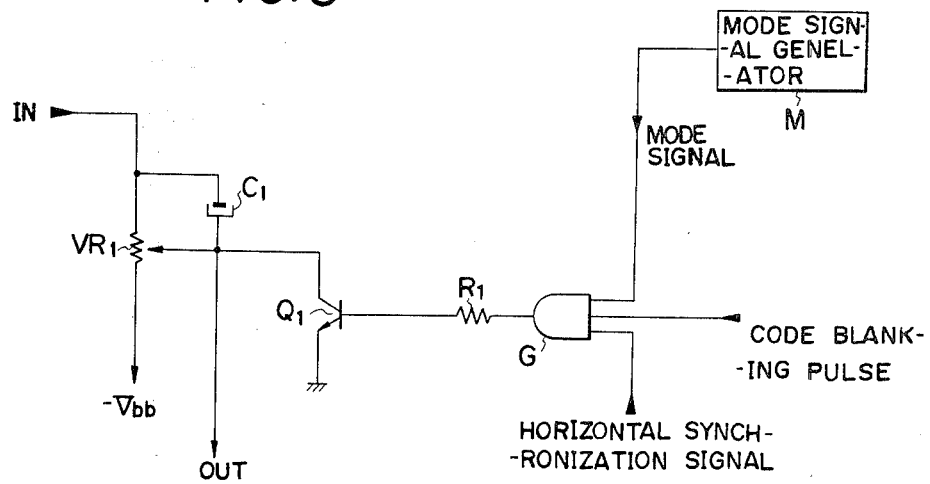
FIG. 3 is a circuit diagram of one preferred arrangement of the code signal blanking apparatus.

FIG. 3 illustrates the preferred circuit arrangement of the code signal blanking apparatus 7. In FIG. 3, an AND gate G renders a switching transistor $Q_1$ conductive, when a mode signal, a code blanking pulse and a horizontal synchronizing signal are each at a high level to supply reference level, e.g., a ground level to an output terminal OUT. In other cases than the above, a signal corresponding to a level of a signal received by an input terminal IN is supplied to the output terminal OUT. The mode signal is supplied from a mode signal generating apparatus M responsive, for example, to the output of the binary code detector 3 and the signal is at a low level during ordinary television broadcasting and at a high level when the television set receives a pay TV broadcasting program to supply the mode signal to the AND gate G for preventing misoperation during the normal broadcasting. The horizontal synchronizing signal is at a high level when the horizontal synchronizing signal is not outputted. A code blanking pulse is a signal supplied, for example, from a circuit as illustrated in FIG. 4 or 5 and each of the circuits outputs a signal of high level during the period of the vertical blanking period when the code signal is superposed on the television signal.

Thus, during the given period of the vertical blanking period of the television signal which is supplied from the video processor 6 and received by the input terminal IN of the code signal blanking apparatus 7 of FIG. 3, a video signal level of the television signal is kept at the ground level to blank the code signal.

Figure 2:
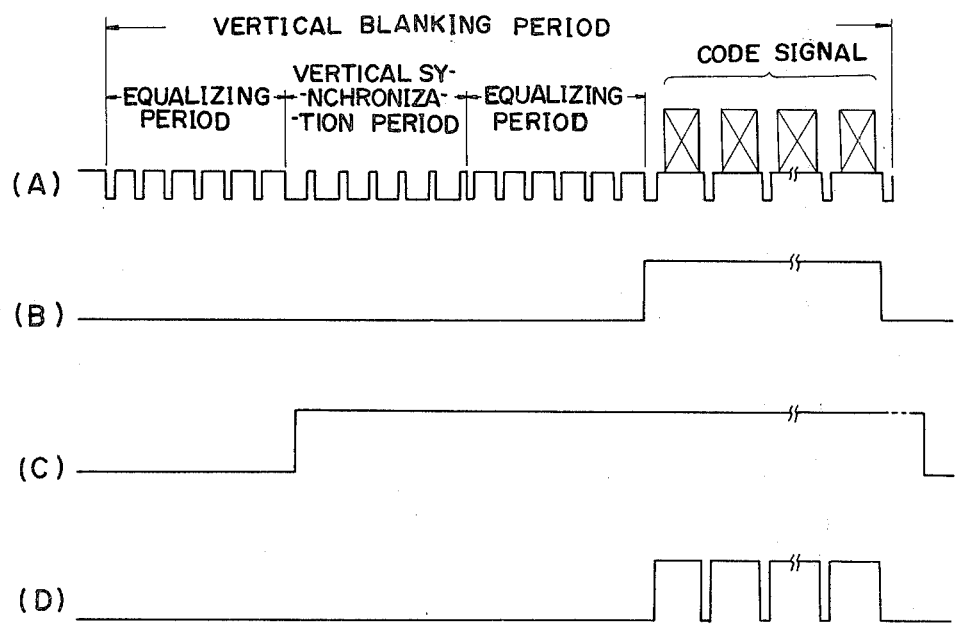
FIG. 2 is a time chart of operation conditions of the code signal blanking apparatus of the present invention.
Figure 4:
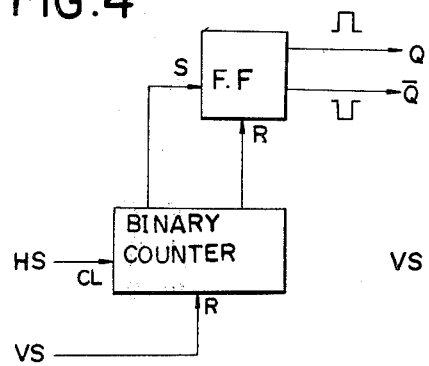
FIGS. 4 and 5 are circuit diagrams of code blanking pulse generating apparatuses.

FIG. 4 illustrates one form of the code signal blanking pulse generating apparatus which employs a binary counter. The binary counter counts a horizontal synchronizing signal HS supplied to a clock input CL and keeps a flip-flop circuit FF in a set state during a period when the code signal is superposed on the television signal. The binary counter is reset by a vertical synchronizing signal. When the code blanking pulse generating circuit as illustrated in FIG. 4 is employed for the code signal blanking apparatus illustrated in FIG. 3, an Q output of the flip-flop circuit is used for the code blanking pulse. A waveform of the Q-output is as shown in FIG. 2 (B). In this case, the output of the AND gate G is as shown in FIG. 2 (D).

Figure 5:
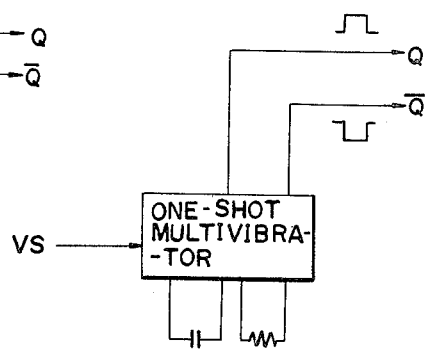

FIG. 5 illustrates another form of the code blanking pulse generating circuit which employs a one-shot multivibrator. This circuit is triggered by a vertical synchronizing signal VS and keeps outputting during a period covering at least the period when the code signal is superposed on the television signal. One example of a waveform of this output is illustrated in FIG. 2 (C).

Figure 6:
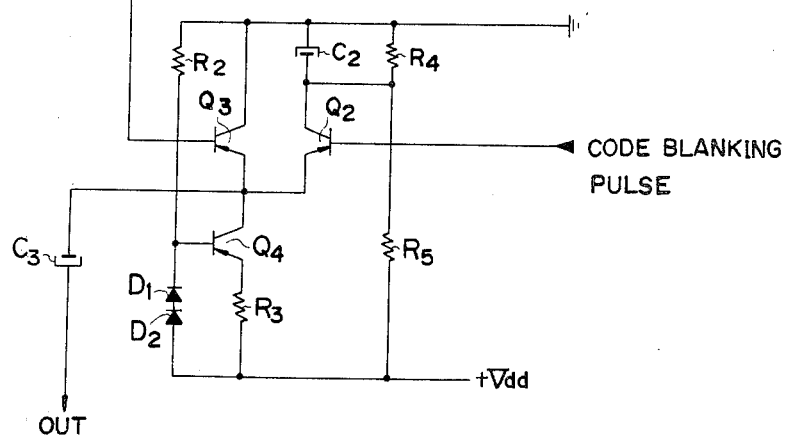
FIG. 6 is a circuit diagram of another preferred arrangement of the code signal blanking apparatus.

FIG. 6 illustrates another form of a code signal blanking apparatus. In the figure, a level determined by a division ratio of a resistor R4 and a resistor R5 coincides with the pedestal level of the television signal. Therefore, the level of the video signal with the code signal blanked therefrom is maintained at the pedestal level. A code blanking pulse is similar to that in the embodiment of FIG. 3. In this circuit arrangement of FIG. 6, it is needed to input a video signal under sufficiently low impedance conditions. An output similar to that in the apparatus of FIG. 3 is obtained through a transistor circuit of an emitter-follower type formed of transistors $Q_3$ and $Q_4$. Diodes $D_1$ and $D_2$ are used for temperature compensation of the transistor $Q_4$.

As mentioned above, according to the present invention, the code signal superposed on the television signal during a vertical blanking period thereof can be easily blanked while maintaining a video signal at a desired level. Thus, the vertical blanking period is effectively utilized, allowing superposition of various signals without exerting any influence on the television set. This invention is further applicable to an ordinary television broadcasting system or a still image transmission system, allowing data transmission utilizing the vertical blanking period.

We claim:
1. A code signal blanking apparatus which comprises:
   a means for receiving a television signal with a code signal superposed thereon during a vertical blanking period;
   a sync separator means for producing horizontal and vertical synchronizing signals from said television signal;
   a pulse generating means for producing a code signal blanking pulse in response to said horizontal and vertical synchronizing signals;
   a switching transistor means adapted to receive the television signal;
   an output terminal for outputting the television signal through said switching means; and
   a gate means responsive to said horizontal synchronizing signal and said code signal blanking pulse for operating said switching means to supply a reference level to said output terminal through said switching means during a given period within the vertical blanking period, thereby blanking the code signal from the television signal.

2. A code signal blanking apparatus as claimed in claim 1, wherein said given period of the vertical blanking period is selected as a part of a horizontal synchronizing signal period of said vertical blanking period.

3. A code signal blanking apparatus as claimed in claim 1, wherein said reference level is selected as a ground level.

4. A code signal blanking apparatus as claimed in claim 1, wherein said reference level is selected as a pedestal level of said television signal.

5. A code signal blanking apparatus as claimed in claim 1, which further comprises a means for producing a horizontal and a vertical synchronizing signal from said television signal and a pulse generating means for producing a code signal blanking pulse in response to said horizontal or vertical synchronizing signal, and wherein said actuating means includes an AND gate which is responsive to said horizontal synchronizing signal and said code signal blanking pulse.

6. A code signal blanking apparatus as claimed in claim 5, wherein said pulse generating means includes a binary counter and a flip-flop circuit, said counter being adapted to count horizontal synchronizing signals and to be reset by a vertical synchronizing signal; and said flip-flop circuit being adapted to be set by an output of said counter.

7. A code signal blanking apparatus as claimed in claim 5, wherein said pulse generating means includes a one-shot multivibrator, said one-shot multivibrator being triggered by a vertical synchronizing signal.

8. A code signal blanking apparatus as claimed in claim 5, which further comprises a means for producing a mode signal which is high when the television signal is a pay-TV signal, said mode signal being supplied to said AND gate.

9. A code signal blanking apparatus as claimed in claim 1, wherein said switching means is comprised of an emitter-follower type transistor circuit, which is connected to a voltage divider circuit for supplying a pedestal level of the television signal.

* * * * *